Jan. 8, 1963 — E. H. LOVETTE — 3,072,295
HOPPER GATE APPARATUS AND CONTROL
Original Filed Oct. 27, 1958 — 3 Sheets-Sheet 1
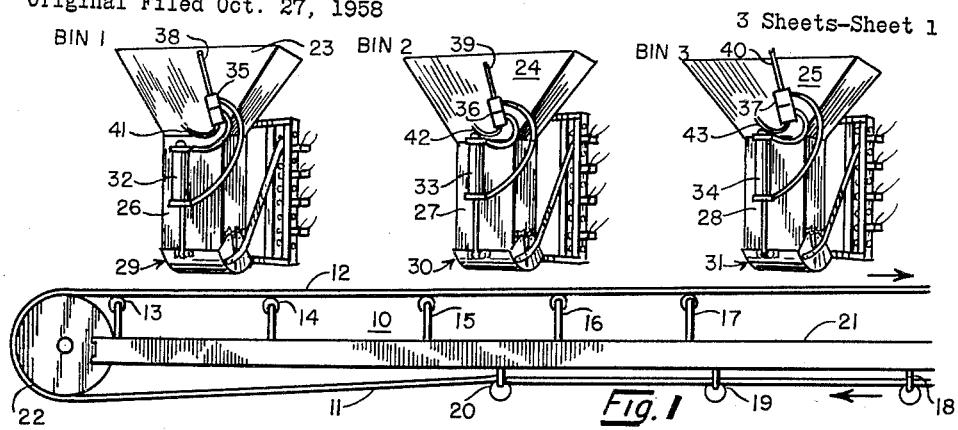
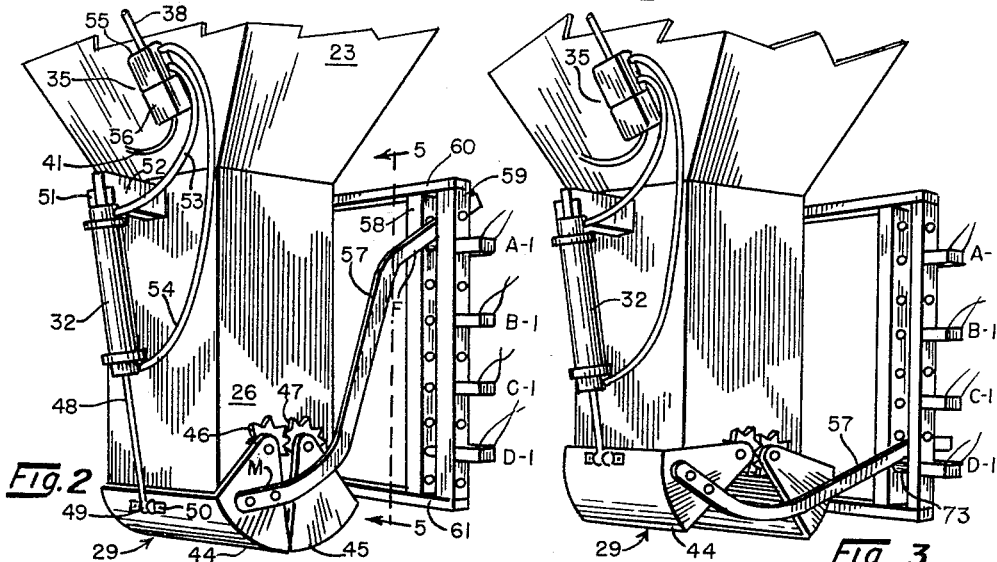
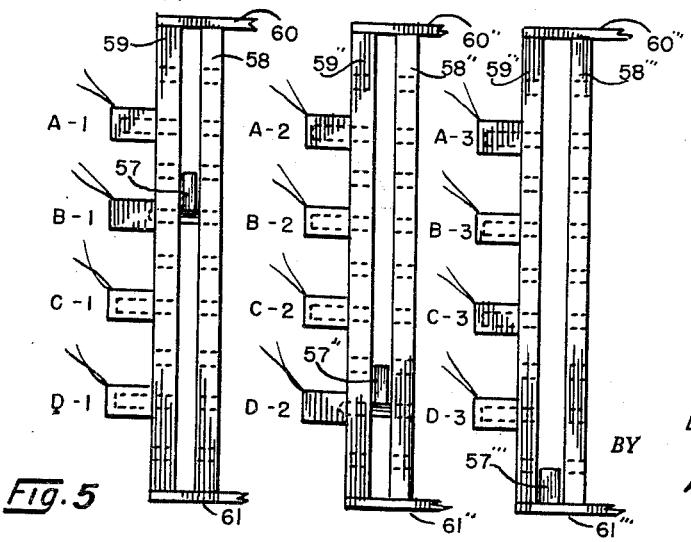
INVENTOR.
EDD H. LOVETTE
BY
B. B. Olive
ATTORNEY

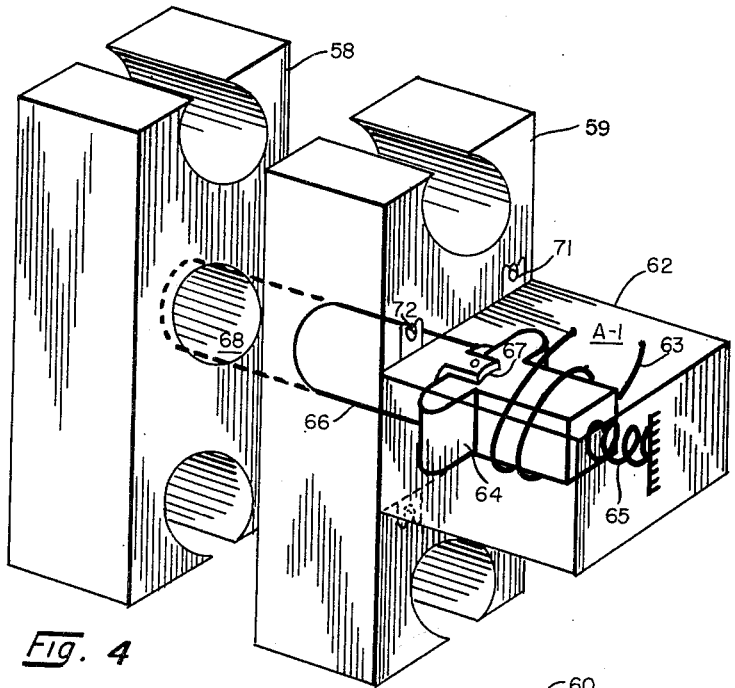
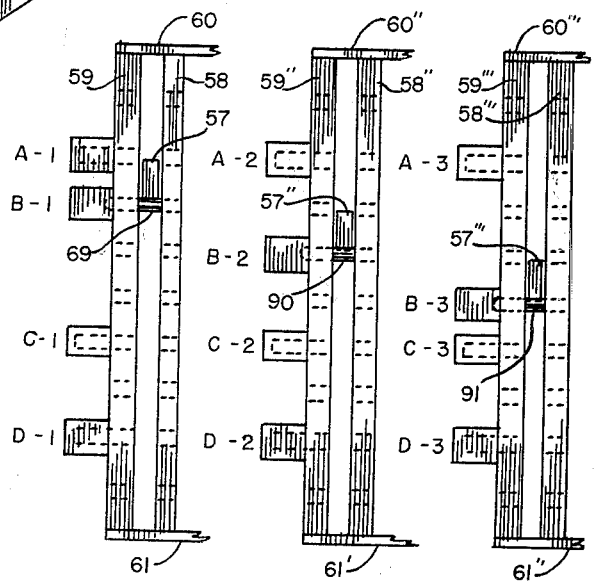
Fig. 4
Fig. 7
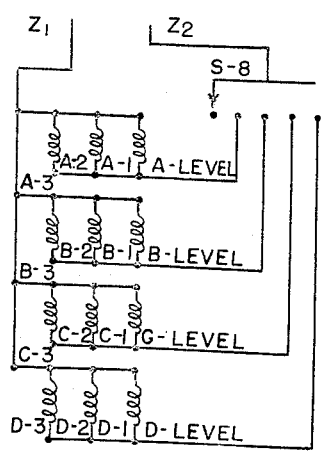
Fig. 8
INVENTOR.
EDD H. LOVETTE
BY
B. B. Olive
ATTORNEY Jan. 8, 1963  E. H. LOVETTE  3,072,295
HOPPER GATE APPARATUS AND CONTROL
Original Filed Oct. 27, 1958  3 Sheets-Sheet 3

INVENTOR.
EDD H. LOVETTE
BY
B. B. Olive
ATTORNEY

United States Patent Office 3,072,295
Patented Jan. 8, 1963

3,072,295
HOPPER GATE APPARATUS AND CONTROL
Edd H. Lovette, Durham, N.C., assignor of twenty-five percent to Hubert O. Teer, Jr., and twenty-five percent to Mary Teer Barringer, both of Durham, N.C.
Original application Oct. 27, 1958, Ser. No. 769,916, now Patent No. 3,042,261, dated July 3, 1962. Divided and this application July 11, 1960, Ser. No. 41,957
5 Claims. (Cl. 222—76)

The present invention relates to an improved control and apparatus for opening and closing hopper gates such as those appearing on the bottom of bins feeding various grades of rock aggregate on to a conveyor belt. This application is a division of my application Serial No. 769,916 filed October 27, 1958, now Patent No. 3,042,261, for Hopper Gate Apparatus and Control.

In the mixing of materials such as rock, it is customary to fill a series of bins with different grades of rock and, during the making up of a particular mix, each of the bins is arranged to feed continuously on to a common conveyor belt along which the bins are separately spaced. Each bin feeds its particular grade of rock through a hopper gate and, by controlling the gate as to the amount of opening, that is, whether full open or less than full open, the rock mix coming off the output end of the belt can be controlled as to percentage content of individual grades. To accomplish the opening and closing of hopper gates such as those mentioned, manual labor is frequently employed. Each time the conveyor belt is started, the operator ordinarily goes to each gate in turn and manually latches it in a desired position and, whenever the conveyor belt is stopped, the operator manually closes the gates.

As a practical matter, it is difficult to maintain a continuous mixing operation for various reasons, such as the need to recharge the bins, or because of the lack of sufficient trucks or other receptacles in which to load the rock mix as it comes off the belt. Furthermore, the percentages of the different grades must be periodically changed for different applications and, consequently, the conveyor belt must be stopped while the necessary gate adjustments are made. In other situations it is sometimes necessary to close the gates on certain bins. For these reasons there is frequent starting and stopping of the mixing operation.

Each time the mixing operation is started, it has been found that best results can be obtained if the conveyor belt is started first, the gates are opened in a particular time sequence and finally, in opening, the gates move rapidly into position. By having a correct time sequence and quick opening of the gates, the mix that comes off the belt ready for loading into a truck or the like, will include contributions in correct proportions from each of the bins. In practice, however, the switch used to start and stop the conveyor belt is usually located near the output end of the belt, whereas the bins are necessarily located at the input end of the belt. This means that, where one or even two operators are employed to control the bin gates manually and start and stop the belt, it is difficult to synchronize gate openings as to both amount and time of opening. On start-up, it frequently happens that the first truckloads of mix are unacceptable due to too much or too little of a particular bin grade being in the mix. Once the first few truckloads are disposed of and a steady state condition is achieved, the mixing proceeds satisfactorily. However, the initial wastage is expensive and undesirable.

In the present invention it has been recognized that, in an ideal rock mixing operation, a supervisory station should exist near the output end of the belt and remote from the bins and at this station means should be provided for selectively controlling each gate as to whether it is opened or closed, the extent of its opening and the time sequence in which it opens with respect to the conveyor belt and other gates.

Prior efforts to achieve a satisfactory rock mixing control have, in some instances, utilized remote supervisory stations. However, generally considerable supplementary equipment has been involved. For example, electric vibrating screens have been located between the hopper gates and the belt. In this system, the rock pours on to a screen for temporary storage where, due to vibration of the screen, the rock will fall on to the belt lying beneath the screen. In other systems, various forms of supplementary gates have been placed between the conventional hopper gates and the belt and control is maintained through control of the supplementary gates. In all such systems, the bin output is limited by the output capacity of the screen or supplementary gate, rather than by the conventional hopper gate. Furthermore, it is of course desirable in any control system to minimize the amount of supplementary apparatus introduced in the system.

It is, therefore, an object of this invention to provide an improved apparatus and control for remote operation of hopper gates, whereby selected gates may be fully or partially opened to any of several openings, and whereby a series of such gates may be opened and closed in a predetermined time sequence and in cooperation with a conveyor belt receiving the output of said gates.

It is another object to provide such an apparatus and control which will allow the aggregate to pour directly on the belt from the hopper without the need for intermediate control devices such as screens or additional gates.

Another object is to provide an improved mix control for a series of hopper gates system in which certain predetermined gate openings may be obtained at the bins through a selective control located remote from the bins.

Other objects and advantages of the invention will be apparent from the following description of the exemplary embodiment of the invention shown in the drawings in which:

FIG. 1 is a somewhat schematic overall view of a three bin rock mixing system incorporating the invention.

FIG. 2 is an enlargement, taken from FIG. 1, of those parts on the bin immediately associated with the invention.

FIG. 3 is similar to FIG. 2, except that the parts included are shown in a different relative position.

FIG. 4 is a schematic view of one of the bin solenoids used in the invention, showing the relative relation of the solenoid components.

FIG. 5 is a schematic sectional view taken in the direction 5—5 shown in FIG. 2 in which the lever means associated with each of the three bins are grouped together in one composite drawing for the purpose of illustrating their cooperative relation and showing how the bin solenoids might be controlled with the circuitry of FIG. 6.

FIG. 7 is similar to FIG. 5 and shows an adjustment that can be made in bin solenoid location for the purpose of utilizing the type of simple bin solenoid control shown in FIG. 8.

FIG. 8 is an additional electric diagram showing one single bank sliding contact switch and a bin solenoid circuit that may be substituted for part of the control circuit shown in FIG. 6 to obtain the form of bin solenoid control pictured in FIG. 7.

Figure 6:
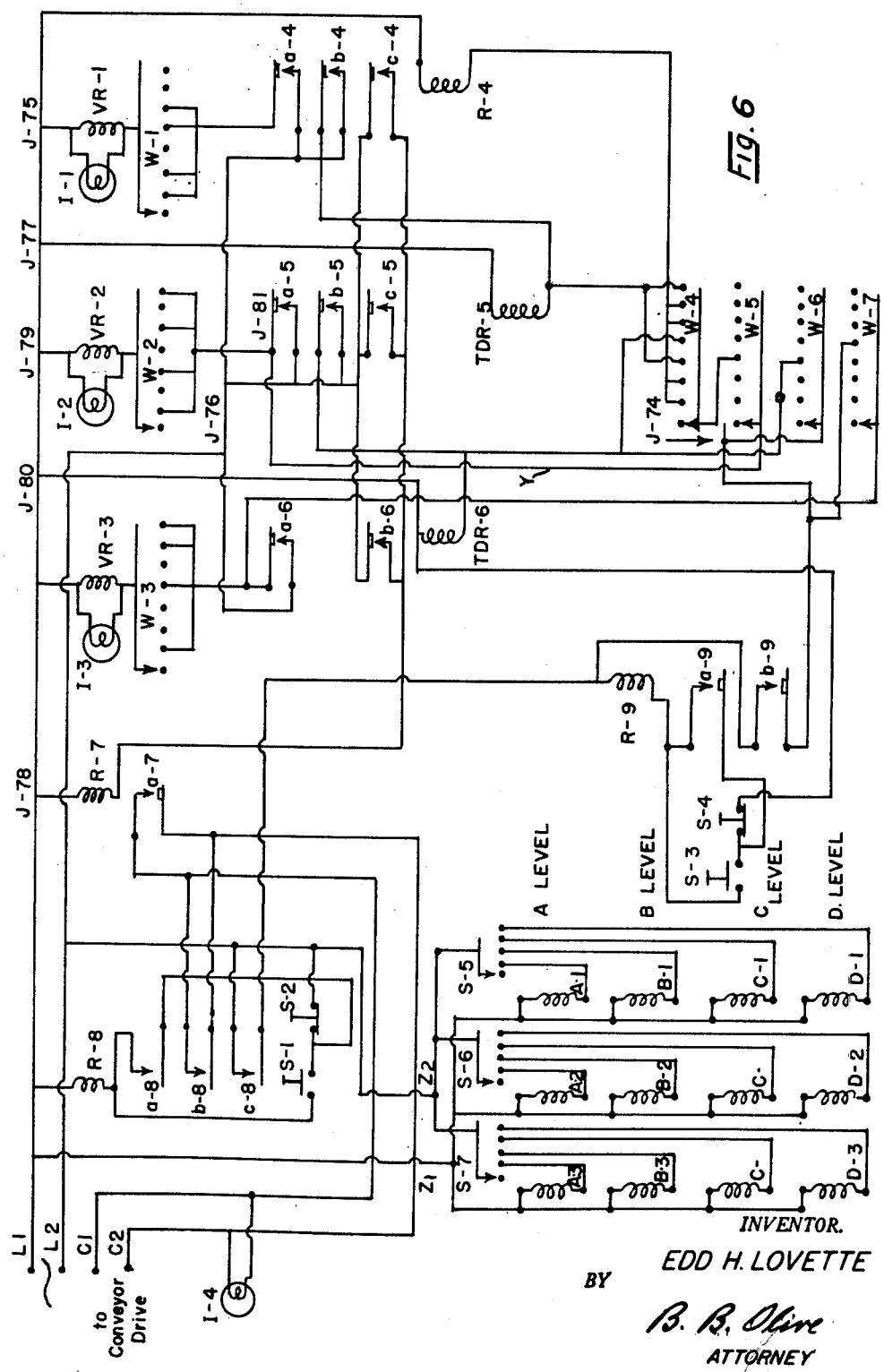
FIG. 6 is an electrical diagram showing the circuitry for the various control means used in the invention, including one form of bin solenoid control.

As shown in FIG. 1, the invention is applied to a three bin system comprising a bin 1, bin 2, and bin 3 overriding a conveyor belt system 10, having a lower run 11 and an upper run 12, moving in the arrow directions shown adjacent the respective runs in FIG. 1. The belt system includes conventional roller supports 13, 14, 15, 16, 17, 18, 19 and 20 mounted on a suitable frame structure 21, which also mounts the necessary belt pulley 22. Since the invention is principally concerned with control of the rock as it initially flows on the belt, FIG. 1 shows only the input end of the belt, or that portion of the belt conveyor system normally utilized in receiving the rock material from the bins. After passing bin 3, it should be understood that any rock on the belt will continue to the output end of the belt, not shown, where it will be discharged into a truck or otherwise stored.

It can be seen further that bin 1, bin 2 and bin 3 are similarly constructed and include funnel shaped storage receptacles 23, 24 and 25 feeding into vertical receptacles 26, 27 and 28. It may be assumed that the bins are kept generally filled by apparatus not shown and not related to the present invention. The vertical receptacles 26, 27 and 28 are closed off at the bottom by suitable hopper gate assemblies 29, 30 and 31 which are opened and closed by pneumatic cylinders 32, 33 and 34 attached to said assemblies. The pneumatic cylinders are controlled by electro-pneumatic valves 35, 36 and 37 which are fed by air supply lines 38, 39 and 40, containing air of suitable pressure, and are connected to electric control wires 41, 42 and 43. The type of electro-pneumatic valves represented are preferably of the type which, when electrically energized, will tend to cause the cylinders 32, 33 and 34 fully to open gate assemblies 29, 30 and 31 and, when electrically de-energized, will tend to cause the cylinders fully to close the gate assemblies. A proper air supply is made available to the valves at all times through lines 38, 39 and 40 and is shut off or shunted to one or other side of the respective cylinder pistons, not shown, as dictated by the electrical state of the valves, all as well known in the art.

In connection with a pneumatic cylinder of the type described, it should be noted that the cylinder piston can be restrained in a less than full open position without damage to the cylinder and this characteristic is taken advantage of in the present invention, as later described. For example, when one of the valves is electrically energized, the cylinder piston associated with such valve will normally receive air pressure that will cause the piston to move to a position corresponding to full open position of the respective gate. However, if after the piston has moved, say, halfway towards such a position, the piston is physically restrained from moving further, no damage results and the piston will continually maintain such halfway position so long as the physical restraint is present to prevent the air pressure from taking full effect. As is described in more detail below, one of the important features of the present invention is the provision of means to restrain the cylinder piston and the attached hopper gate in any of several positions between closed and full open.

Referring now to FIG. 2, there is shown an enlargement of the apparatus located in and around the gate assemblies and, since each of the bins contains similar apparatus, explanation is made in reference to bin 1 apparatus. As previously stated, located beneath vertical receptacle 26 is gate assembly 29 which, in the embodiment shown, comprises a clam bucket type gate having two pivoted sections 44 and 45 with intermeshing spur gears 46 and 47 attached to each respective section such that the two sections will open and close together. That is, whenever section 44 is opened or closed, section 45 is opened or closed the same amount because of this intermeshing gear linkage.

Attached to section 44 is cylinder 32 having a piston rod 48 pivotally connected at 49 to bracket 50 located on section 44. Cylinder 32 is also pivotally connected at 51 to fixed bracket 52 mounted on vertical receptacle 26. Leading to cylinder 32 are air lines 53 and 54 which direct air pressure to the respective upper and lower sides of the cylinder piston, not shown, as controlled by air valve 55 whose position, in turn, is controlled by a solenoid located within housing 56 through control wires 41. For example, when the solenoid within housing 56 is energized, air pressure is directed from air supply 38 through air valve 55 to air line 54 causing piston rod 48 to move into cylinder 32 which causes sections 44 and 45 to open fully, thus fully opening the bottom end of receptacle 26, which allows any rock contained therein to move out of bin 1 to the top run 12 of conveyor belt system 10.

With the apparatus thus far described, the gate assemblies 29, 30 and 31 can be fully opened and fully closed by maintaining suitable air pressure in lines 38, 39 and 40 and by electrically energizing, for opening, and electrically de-energized, for closing, electro-pneumatic valves 35, 36 and 37, such apparatus and functioning being conventional and not claimed herein except as the same are part of the combination described and claimed.

As previously indicated, it is usually desirable when producing a mix of various sizes that one or more of the gate assemblies be less than full open since, by doing so, the percentage content of the various sizes can be controlled. For example, assume that bin 1 contains a size #7 rock, bin 2 a size #10 rock and bin 3 a size #12 rock, and it is desired to produce a mix whose unit volume comprises 50% of #7, 25% of #10 and 25% of #12. Assume further that, by experimentation, it is found that the flow characteristics of the various sizes are such that when the gate assembly for bin 1 is fully open and the gate assemblies for bins 2 and 3 are half open, that the rock mix coming off the conveyor belt will contain the percentage stated. To obtain such a condition, the invention recognizes and follows the preferred sequence of operation previously discussed in which the belt drive, not shown, for the conveyor belt system 10 is started, so that the upper and lower belt runs will start moving in the arrow directions indicated in FIG. 1. After the belt is moving, gate assembly 29 for bin 1 is fully opened, which allows size #7 rock to fall on top belt run 12 and form a single layer that moves towards gate assembly 30 on bin 2. As soon as the leading end of the single layer of size #7 rock coming from bin 1 reaches a point beneath gate assembly 30, gate assembly 30 is half opened, which allows a single layer of size #10 rock from bin 2 also to flow on belt run 12. The single layer of size #10, in lesser proportionate quantity, forms a second single layer of rock above the single layer of size #7 previously placed on the belt from bin 1. With the belt still running, the leading end of what is now a double layer composed of sizes #7 and #10 proceeds towards gate assembly 31 on bin 3 and, upon reaching a position beneath gate assembly 31 gate assembly 31 is half opened, which allows a third single layer composed of size #12 rock to form above the previously formed double layer composed of #7 and #10 rock, producing a triple layer composed of sizes #7, #10 and #12. As the leading end of this last-mentioned triple layer proceeds on the belt, it can be seen that a composite mix of 50% of #7, 25% of #10 and 25% of #12 has been obtained and is available to the output end of the belt for loading into trucks or other storage devices.

In order better to understand how such gate openings and sequence is obtained, reference is made to FIG. 2 in which it will be seen that an S-shaped lever 57 is rigidly attached to the side of section 44, which means of attachment may be by bolting, as indicated at M, by welding or other suitable means. Because of the fact that lever 57 is attached to the side of section 44, the end of lever 57 will move up and down in a fixed vertical path with each opening and closing operation of cylinder 32. It will be noticed that the end of lever 57 is arranged to travel between two fixed vertical rail members 58 and 59, supported by a top fixed member 60 and a bottom fixed member 61. Members 58, 59, 60 and 61 are fixed structural members and may be welded or otherwise rigidly joined together in the relation indicated in FIG. 2 and attached through members 60 and 61 to a separate fixed structural member such as to a bin supporting member, not shown. As best illustrated in FIGS. 2 and 3, vertical members 58 and 59 contain a series of matching holes passing through the members and arranged at different elevations, the axis of each respective pair of matching holes being generally in a horizontal plane and lying perpendicular to the face F of lever arm 57. In the embodiment shown, nine such pairs of matching holes are provided in vertical members 58 and 59.

Mounted at different elevations along rail member 59 are electric bin solenoids A-1, B-1, C-1 and D-1, the letters A, B, C and D indicating the respective solenoid elevation such as being at A level, B level, C level or D level of elevation and the number 1 indicating that such solenoids are associated with bin 1. The bin solenoids are preferably of the well known type having a spring loaded armature that normally remains within the solenoid housing so long as the solenoid is de-energized and which attempts to move out of the housing toward, for example, member 58 when energized.

In reference to FIG. 4, there is seen a somwhat schematic b'own-up view of the A-1 bin solenoid. In FIG. 4, 62 represents the housing of solenoid A-1 and, contained within the housing is coil 63 controlling armature 64, normally held within the housing by spring 65. 66 represents the next hole down from the top hole in member 59 and in hole 66 resides pin 67, attached to armature 64 so that the position of pin 67 in hole 66 is, in effect, controlled by armature 64. With coil 63 de-enregized, armature 64 and, in turn, pin 67, tend to remain withdrawn towards spring 65 acting on armature 64. However, in such a solenoid, when 63 is energized, the electrical reaction and electrical design are such that armature 64 tends to move out of housing 62 towards vertical member 58 and thus pin 67 is caused to move through hole 66 into matching hole 68 located in vertical member 58. With pin 67 now located in hole 68, it can be seen that pin 67 will provide an obstruction to the free passage of lever 57 in the event lever 57 attempts to move past matching holes 66 and 68. As is explained later, such obstruction can be established at any of the four levels A, B, C or D, prior to the lever moving toward open position and thus the lever can be stopped at any of these levels.

In further reference to FIG. 4, the solenoid housing 62 is preferably fixed to member 59 by means such as screws 71 and 72, which will enable the bin solenoid to be moved up and down on member 59 so as to allow pin 67 to be operated through any of the several pairs of holes located at the different levels. For example, referring to FIG. 2 it will be noticed that there are vacant pairs of holes both above and below each of the bin solenoids. Thus, it is possible, for example, to mount the A-1 solenoid either as shown in FIG. 2 or opposite the top pair of holes, or opposite the third pair of holes counting down from the top of member 59. Thus, pin 67 can be made to furnish an obstruction to movement of lever 57 at the A lever or at levels slightly above or slightly below the A level.

Referring back to FIG. 2, it will be noticed that lever 57 is in fully raised position, corresponding to fully closed position of gate assembly 29. Assuming that it is desired to open gate assembly 29 partially open in a position that corresponds with the end of lever 57 being opposite bin solenoid D-1, that is, it is desired to have the end of lever 57 move to what is termed the D level. This is accomplished by leaving bin solenoids A-1, B-1 and C-1 de-energized and energizing bin solenoid D-1 immediately prior to electrically energizing valve 35, which normally causes cylinder 32 to open fully gate assembly 29. Since bin solenoid D-1 is energized prior to movement of section 44 and thus prior to movement of lever 57, pin 73 represented in FIG. 3 as being associated with bin solenoid D-1, will move through its respective pair of matching holes located in members 58 and 59 and will block the motion of lever 57 beyond the D level. As cylinder 32 operates on gate assembly 29, sections 44 and 45 are opened, but only to the extent allowed by lever 57, which is prevented from moving below the D level by reason of the obstructing action of pin 73.

Referring now to FIG. 5, there is shown a somewhat schematic representation of how the invention operates when applied to a series of bins. In interpreting FIG. 5, the viewer may assume that he is standing on the opposite side of the bins from that pictured in FIG. 1, and that he is looking generally in the direction 5—5 indicated in FIG. 2. While the bins are normally spaced a considerable distance apart and, as a practical matter, it would be difficult to observe the operation at each of the bins simultaneously, for the purposes of FIG. 5 the lever apparatus for the three bins is pictured together to facilitate an understanding of the cooperative relation.

Referring more specifically to FIG. 5, there is shown the top supporting member 60 for bin 1 and, similarly, top supporting members 60″ and 60‴ for bins 2 and 3 respectively. Lower supporting member 61 for bin 1 has related members 61″ and 61‴ for bins 2 and 3 respectively and, in the same sense 58 and 59 represent the two vertical rail members for bin 1 and 58″ and 59″ represent the two vertical members for bin 2 and 58‴ and 59‴ represent the two vetrical members for bin 3. Associated with bin 1 are bin solenoids A-1, B-1, C-1 and D-1; with bin 2 are bin solenoids A-2, B-2, C-2 and D-2 and with bin 3 are bin solenoids A-3, B-3, C-3 and D-3. Associated with bin 1 is lever 57, with bin 2 is lever 57″ and with bin 3 is lever 57‴.

Assume that, with experimentation, it has been found that a given percentage mix will be obtained when gate assembly 29 for bin 1 is opened to the B level, gate assembly 30 for bin 2 is open to the D level and gate assembly 31 for bin 3 is fully opened. With such a requirement in mind, such a gate condition may be obtained as follows. Bin solenoids B-1 and D-2 only are energized which places pins 69 and 70 in blocking position. The remainder of the bin solenoids are kept de-energized. Valve 35 is next electrically energized, causing cylinder 32 to open gate assembly 29 and, in opening, lever 57 will strike pin 69 associated with bin solenoid B-1. Further opening of the assembly 29 will be prevented and assembly 29 will be maintained in a position corresponding to the B level opening. Valve 36 is next electrically energized which causes cylinder 33 to open gate assembly 30 on bin 2. In this instance, lever 57″ will move down until it strikes pin 70 associated with bin solenoid D-2 and thus gate assembly 30 will be opened to the D level and no further. Valve 37 is next energized which causes cylinder 34 to open gate assembly 31 and, in this instance, gate assembly 31 will open full open since all of the pin 3 solenoids A-3, B-3, C-3 and D-3 are de-energized, thus offering no obstruction to the movement of lever 57‴ associated with gate assembly 31. It should be understood that, during the operation described, suitable air pressure is constantly maintained in lines 38, 39 and 40. Therefore, as long as any of the valves 35, 36 and 37 are electrically energized, the respective cylinder pistons associated with such valves will attempt to move towards full-open position and will maintain a full open or less than full open position according to whether or not they are restrained by reason of bin solenoid pins obstructing the lever means referred to above.

The explanation will now proceed to FIG. 6 and the circuitry used to operate the bin solenoids, the bin cylinders, the conveyor drive and the various devices utilized to introduce time sequence. Referring to FIG. 6, L-1 and L-2 represent incoming power supply lines of voltage and frequency appropriate to whatever ratings are chosen for the various switching, relay and other electrical devices necessary for the invention. S-1 and S-2 represent an on-off switch combination for starting the conveyor belt drive in which S-1 is normally off and S-2 is normally on. R-8 represents a switch relay associated with S-1 and S-2, having contacts $a$-8, $b$-8 and $c$-8, this relay being controlled by operation of switches S-1 and S-2. R-7 is a holding relay having contact $a$-7 and whose purpose is to maintain power in the conveyor drive so long as any of the valves associated with the gate assemblies are electrically energized. VR1, VR2, and VR3 represent the electrical solenoids associated with cylinder valves 35, 36 and 37 for bins 1, 2 and 3 respectively. That is, the cylinder solenoids VR1, VR2 and VR3 are located on the bins in association with valves 35, 36 and 37 as indicated in FIG. 1. VR1 for example is assumed to be physically located within solenoid housing 56 shown in FIG. 2. I-1, I-2, I-3 and I-4 represent indicating lamps, indicating when power is available in the lines with which these lights are shown as being associated. W-1, W-2, W-3, W-4, W-5, W-6 and W-7 represent seven individual banks of a seven bank wafer switch, having eight points of contact in each blank, one of which points is an off point. In such a switch the sliding contacts associated with the respective banks are all mounted on a common shaft so as to rotate together. Thus, while the seven banks are separated in the circuit diagram, it should be understood that the seven banks actually comprise one composite switch.

R-4 represents a relay having contacts $a$-4, $b$-4 and $c$-4 and through which bin solenoid VR1 is energized. TDR5 and TDR6 are time delay relays having contacts $a$-5, $b$-5 and $c$-5 and $a$-6 and $b$-6 respectively and which are used to energize bin solenoids VR2 and VR3 on a delayed basis. TDR5 and TDR6 are preferably double-acting so as to introduce the proper delay on both opening and closing. R-9 is a switch relay having contacts $a$-9 and $b$-9 and which is controlled by the associated on-off switch combination S-3, S-4 in which S-3 is normally off and S-4 is normally on, the basic purpose of S-3, S-4 being to control opening and closing of the gate assemblies. C-1 and C-2 represent lines leading to whatever electrical device such as a relay, is used to start the conveyor drive, which device is not otherwise shown in the drawing.

S-5, S-6 and S-7 represent three separate single bank, five point sliding contact switches. As previously indicated, A-1, B-1, C-1 and D-1 represent the bin solenoids for bin 1; A-2, B-2, C-2 and D-2 for bin 2 and A-3, B-3, C-3 and D-3 for bin 3, all of the so-called A solenoids being at the so-called A level as indicated in FIGS. 5 and 6, all B solenoids being at B level and all C solenoids being at C level and all D solenoids being at D level. Power is supplied to the entire group of bin solenoids through lines $Z_1$ and $Z_2$ and it will be noticed that S-5 controls A-1, B-1, C-1 and D-1; S-6 controls A-2, B-2, C-2 and D-2 and S-7 controls A-3, B-3, C-3 and D-3. Thus any one or all of these solenoids can be energized or de-energized at will whenever lines $Z_1$ and $Z_2$ are energized. Lines $Z_1$ and $Z_2$ in turn are energized through operation of the conveyor on-off switch $S_1$-$S_2$ as will be better understood as the description proceeds.

In interpreting FIG. 6, certain electrical components shown in FIG. 6 are preferably brought to a central panel board, not shown, located at some point convenient to an operator and enabling him to see both the input and output sections of the conveyor belt system 10. For example, indicating lights I-1, I-2, I-3 and I-4 should be brought to such a panel. In addition, the on-off switches S-1, S-2 and S-3, S-4 should appear at the same panel. The composite seven bank wafer switch compromising banks W-1 through W-7 should also be at this same panel. As will become clear as the description proceeds, it becomes possible by bringing all such switches to a central panel to furnish a point remote from the bins at which any bin or combination of bins can be opened at any of a number of positions and in time sequence.

Before undertaking a particular mixing operation employing the circuitry described, the operator must determine which bins are required to be open and the extent of their opening. In some situations, the operator may want to draw rock only from bin 1 or a combination of, say, bin 1 and bin 3 and, further, the amount of opening at any particular bin may change from one mix to another. Once it is known which bins are to be open and the amount of the opening, such information is preset in the control system before the mixing operation actually gets under way.

So far as bin openings are concerned, reference is now made to the switches S-5, S-6 and S-7 and the bin solenoids controlled by these switches. If, as an example, we assume that bin 1 is to be fully opened, the S-5 sliding contact should remain in the position shown in FIG. 6 since, in this position, no power is fed from the lines $Z_1$ and $Z_2$ to any of the solenoids A-1, B-1, C-1 and D-1 located on bin 1. If we assume further that bin 2 is to be opened to the C level, then the S-6 sliding contact should be moved to the fourth contact from the left on switch S-6, in which position power can be fed from line $Z_1$ through bin solenoid C-2 through switch S-6 and back to line $Z_2$. Assuming further that bin 3 is to be opened to the A level, the S-7 sliding contact should be moved to the right one position to the second contact point which will furnish a complete circuit from line $Z_1$ through A-3, through switch S-7 and back to line $Z_2$. With the bin solenoids set as described, it can be seen that as soon as lines $Z_1$ and $Z_2$ are energized through switches S-1, S-2, bin solenoids C-2 and A-3 are energized and, consequently, the blocking pins associated with these solenoids will, when the respective solenoids are energized, furnish an obstruction to levers 57″ and 57‴ at the C and the A levels respectively. To summarize the foregoing, it can be seen that by manually setting the switches S-5, S-6 and S-7, various degrees of obstruction can be placed in the path of the levers 57, 57″ and 57‴ whenever lines $Z_1$ and $Z_2$ are energized.

The other basic information which is preset into the control prior to starting is the establishment of circuits only to those bins that are desired to be opened. This is accomplished by setting the seven bank wafer switch comprised of banks W-1 through W-7. Looking at these individual banks, it can be seen that each bank has eight points of contact. Considering the off contact at which each of the sliding contacts are shown as being located in FIG. 6, as contact point #1 counting to the right, we can consider the contact points as being points #2, #3, #4, #5, #6, #7 and #8 with contact point #8 being furthest removed from the off contact point #1. It should be kept in mind that banks W-1 through W-7 actually comprise one composite switch in which the sliding contacts for all of the banks W-1 through W-7 move together, so that they are all on, say, off position at the same time, as shown in FIG. 6 and similarly, they move together to any other position when the common shaft, not shown, on which the sliding contacts are mounted, is rotated from the off contact to any of the other eight points of contact.

The seven bank wafer switch is connected according to the following table indicating those bins that are opened and closed in the various contact positions. For example, when the wafer switch is moved to contact point #3, a circuit is completed to bin 1, but not to bins 2 and 3. Consequently, on contact point #3, bin 1 opens and bins 2 and 3 remain closed so that if this condition is desired, the wafer switch should be set on contact point #3 before starting the mixing operation, which setting acts to preset the control so that only bin 1 will be opened when the operation is begun.

| Wafer Switch (Banks W-1 through W-7) Contact Position | Bin 1 | Bin 2 | Bin 3 |
|---|---|---|---|
| #1 | closed | closed | closed. |
| #2 | open | open | open. |
| #3 | open | closed | closed. |
| #4 | closed | open | closed. |
| #5 | closed | closed | open. |
| #6 | open | open | closed. |
| #7 | open | closed | open. |
| #8 | closed | open | open. |

To illustrate operation of the circuit, a typical mix situation will be considered. It will be assumed that bin 1 is to open to the B level, bin 2 to the D level and bin 3 to full open. Since all three bins are to be opened, contact point #2 on the seven bank wafer switch should be employed since, as the table indicates, this will allow circuits to be completed to each bin. After setting the seven banks wafer switch, the switch S-5 sliding contact should be moved to the third or middle contact in order to establish a circuit through bin solenoid B-1 corresponding to the B level blocking pin 69 (FIG. 5) on bin 1. Similarly, the switch S-6 sliding contact should be moved to the fifth or last contact in order to establish a circuit through bin solenoid D-2 corresponding to the D level blocking pin 70 (FIG. 5) on bin 2 and, finally, the switch S-7 sliding contact should remain in the first or off contact in order to maintain all of the bin 3 solenoids A-3, B-3, C-3 and D-3 inactive. With the seven bank wafer switch, W-1 through W-7, rotated to the correct point of contact, and the switches S-5, S-6 and S-7 set in their respective positions, the mixing operation is ready to be started.

Lines L-1, L-2 are energized by any suitable means and, as previously mentioned, the conveyor belt is normally started prior to opening any gates. In order to start the belt after L-1, L-2 are energized, S-1 is momentarily depressed, which completes the circuit from L-1 through R-8, through S-1, S-2 and L-2, closing contacts a-8, b-8 and c-8. After S-1 is released, contacts a-8 serve to hold the relay R-8 in acting through switch S-2. Contacts b-8 act to connect lines C-1, C-2 which, as previously mentioned, are presumed to be part of any suitable circuit such as a relay, not shown, used to start the conveyor belt motor drive. Therefore, with the closing of contacts b-8, the conveyor belt is started. Contacts c-8, which are also closed by the action of relay R-8 now act to furnish a circuit from L-2 to one side of relay R-9. With the energizing of lines L-1 and L-2, it should also be noticed that lines Z-1 and Z-2 will also have been energized so that in the example described, bin solenoids B-1 and D-2 are energized through the circuits previously traced. With this much of the circuit functioning, the conveyor belt will have been started and the desired bin solenoid blocking pins will have been moved into their respective blocking positions.

The next operation is that of opening the gate assemblies. To accomplish this, S-3 is momentarily depressed which completes the circuit from L-2 through contacts c-8 through relay R-9, through switches S-3, S-4 and to L-1 at junction J-30, by which contacts a-9 and b-9 are made to close. Contact a-9 is a relay holding contact as illustrated, whereas contact b-9 acts to connect line L-2 through contacts c-8 to wafer banks W-4, W-5, W-6 and W-7 at junction J-74.

With L-2 connected to junction J-74 and with each of the wafer banks W-1 through W-7 set on contact point #2, circuits will be completed as follows. Starting at J-74, a circuit will be completed through W-4 and through R-4 back to L-1. Upon R-4 being energized, contacts a-4, b-4 and c-4 are closed. The closing of contact a-4 in turn completes a circuit from L-1 at junction J-75 through cylinder solenoid VR1, through W-1, through a-4 and to L-2 at junction J-76. The closing of contacts b-4 completes a circuit from junction J-77 on L-1 through TDR5 through contact b-4 and back to L-2 at junction J-76. Contacts c-4, upon being closed, complete a circuit from L-1 at junction J-78, through relay R-7, through contacts c-4 and to L-2 at junction J-76. The completion of the previously mentioned circuit through cylinder solenoid VR1 will, in turn, cause cylinder 32 to open gate assembly 29 which amount of opening in the example will not go beyond the B level since lever 57, upon moving down, will strike the previously placed pin 69 associated with bin solenoid B-1 and thus gate assembly 29 will be maintained at the B level by the air pressure in cylinder 32, which is assumed to remain constantly available. At this point, the conveyor belt has been started, the bin solenoids have been energized and bin 1 is open at the B level.

The energizing of time delay relay TDR5 acts to close contacts a-5, b-5 and c-5. Contact a-5 serves to complete a circuit from junction J-79 on L-1 through VR2, through W-2, through contact a-5 and back to L-2 at junction J-76. Contacts b-5 act to complete a circuit between L-1 at junction J-80 through TDR6 through contacts b-5 and back to L-2 at junction J-76. Contacts c-5, similar to contacts c-4, complete a circuit between L-1 at junction J-78 through R-7 through contacts c-5 to L-2 at junction J-76. Once time delay relay TDR5 has closed contacts a-5, b-5 and c-5, following its predetermined time delay, cylinder solenoid VR2 will be activated and cylinder 33 will open gate assembly 30, but only to the D level since, in the example chosen, bin solenoid D-2 will have been previously activated, thus serving to block the passage of lever 57" beyond the D level.

As previously mentioned, the closing of contacts b-5 serves to energize time delay relay TDR6 which, after its predetermined time delay, causes contacts a-6 and b-6 to close. Closing of contacts a-6 serves to energize cylinder solenoid VR3 and the closing of contacts b-6 serves to complete a circuit through relay R-7, these circuits being established in the manner of those circuits previously discussed.

With the various circuits completed as described above, the following operations will have taken place. Following energization of L-1, L-2, bin solenoids B-1 and D-2 will have been activated. Next, the conveyor belt will have been started. After this, the gate assembly 29 for bin 1 will have been opened to the B level, the gate assembly 30 for bin 2 will, after a delay, have been opened to the D level and, finally, the gate assembly 31 for bin 3 will, after a further delay, have been fully opened. As mentioned, during the opening of the gate assembly 29, 30 and 31, a predetermined time delay will have been established between the opening of bin 1 and bin 2 and between the opening of bin 2 and bin 3. This time delay may, of course, be established at any amount desired. However, as previously suggested, it is desirable that the delay between bin 1 and bin 2 be substantially equal to the amount of time required for rock to move on the belt from beneath bin 1 to beneath bin 2. Similarly, the opening of bin 3 should follow the opening of bin 2 by a time delay substantially equal to the amount of time required for rock to move on the belt from a position beneath bin 2 to a position beneath bin 3. With such a time delay, the mix that first comes off the belt will be an acceptable blend.

As previously indicated in the table set forth, any single bin, or any combination of two or more bins may be opened by rotating the seven bank wafer switch, W-1 through W-7, to the correct contact point. In the example described, the wafer switch is assumed to be rotated to contact point #2 in which all of the bins opened. The table may be verified for other points of contact by tracing the circuits through in the manner outlined in the example in regard to contact point #2. It should be mentioned that in using contact points #3, #4 or #5 on the seven bank wafer switch, it will be noticed that only one bin is to be employed on each of these contact points. Therefore, it is not necessary to introduce time delay and, for this reason, when the seven bank wafer switch is set on contact #4, for example, bin 2 only is opened and time delay relay TDR–5 is bypassed, cylinder valve solenoid VR–2 being energized directly. This particular circuit condition can be observed by tracing from junction point J–31 along line Y and through the sliding contact for W–5 when set on contact point #4, since it will be apparent that a direct circuit can be established through these lines from contact $b$–9 (which is connected to L–2) to VR–2 (connected to L–1) through W–2 (assumed to be on #4 contact) without utilizing the circuit time delay relay TDR–5. Other circuits may be traced accordingly.

One feature of the circuit shown in FIG. 6 is the provision of relay R–7, which acts to keep the conveyor belt running so long as any of relays R–4, TDR–5 or TDR–6 are energized. Thus, so long as any of the contacts $c$–4, $c$–5 or $b$–6 are closed, relay R–7 will remain energized, thus keeping contacts $a$–7 closed and, in turn, completing the circuit between lines C–1 and C–2. This characteristic of the system insures that the conveyor belt will be available to transfer immediately from beneath any bin any rock that comes from such bin, so as to avoid accumulation on the belt.

FIG. 7, which is similar to FIG. 5 and FIG. 8, which is somewhat similar to that portion of the bin solenoid circuitry connected to Z–1 and Z–2 in the lower left corner of FIG. 6, are shown to illustrate a further modification of the invention. In practice, it has been found in many mixes, such as those used for highway construction, that, by filling each of the bins with the required different grades of rock, a suitable mix may be obtained if the gates are open partially and in about the same amount since, even though the gates may be open substantially the same amount, the flow characteristics of the different grades will still cause more or less of certain grades to flow on the belt. Looking now specifically at FIG. 7, it will be recalled that mention was made of the fact that the bin solenoid housing 62 (FIG. 4) can be adjusted up and down the vertical rail members to maintain holes at different elevations on the rail. In FIG. 7, B–1 is represented as being connected opposite the third pair of holes counting down from the top of member 59, rather than being connected opposite the fourth pair of holes from the top of 59 as represented in FIG. 2. B–2 on the other hand, is to be construed in FIG. 7 as being mounted opposite the fourth pair of holes counting down from the top of member 59″. Similarly, B–3 is intended to be represented as being opposite the fifth pair of holes counting down from the top of member 59‴. With the arrangement shown in FIG. 7 it can be seen that if bin solenoids B–1, B–2 and B–3 are energized at the same time, a slight but useful variation in the bin opening can be obtained since the bin solenoids B–1 and B–3 are slightly above and below, respectively, the B level position and this slight variation is adequate in practice for many situations.

FIG. 8 represents a circuit which may replace that part of the bin solenoid circuit of FIG. 6 shown connected through lines Z–1 and Z–2. That is, switch S–8 and the bin solenoid circuitry related thereto may replace switches S–5, S–6 and S–7 and the bin solenoid circuit related to these latter switches for the type of mixes described. In FIG. 8, it will be noted that the first contact point to the left on S–8 is an off contact; the second contact point on S–8 completes a circuit through all of the A solenoids; the third contact point completes a circuit through all of the B solenoids, the fourth contact through all the C solenoids and the fifth contact through all of the D solenoids.

To illustrate use of the circuitry shown in FIG. 8, it should be first assumed that the bin solenoid circuitry pictured in the lower left corner of FIG. 6 attached to lines $Z_1$, $Z_2$ is replaced by the bin solenoid circuitry shown in FIG. 8 and that the remainder of the circuit shown in FIG. 6 remains as shown in FIG. 6. Assuming further that it is known that the particular mix required can be obtained by opening all of the bins to the B level, with bin 1 being opened slightly less than the B level and bin 3 being opened slightly more than the B level. With this known requirement, B–1 should be mounted slightly above the B level, B–2 should be mounted at the B level and B–3 should be slightly below the B level as represented in FIG. 7. With the bin solenoids located at these respective levels, the B–1 pin 69 will block lever 57 on bin 1 at an opening corresponding to something slightly less than the B level. Similarly, pin 90 for B–2 will block lever 57″ at a bin opening corresponding exactly to the B level and pin 91 on B–3 will block lever 57‴ at a bin opening corresponding to something slightly more than B level.

To preset the condition shown in FIG. 7, the sliding contact on S–8 should be moved to the third or middle contact position before L–1 and L–2 are energized. Since we have assumed that all bins are to be utilized in this example, the seven bank wafer switch should be left on its contact position #2 as in the previous example discussed. With S–8 and the seven bank wafer switch set as described, the mixing operation may commence and, as before, to start this operation L–1, L–2 are first energized, which causes the bin solenoids B–1, B–2 and B–3 to energize and move the blocking pins 69, 90 and 91 into the position shown in FIG. 7. Following this, the conveyor belt may be started by momentarily depressing S–1 and, after this, the various bin solenoids may then be energized by momentarily depressing S–3. With this sequence of operations, using the circuitry of FIG. 8 and the solenoid arrangement of FIG. 7, the bin solenoid pins will have been placed in position, the conveyor belt will have been started and the three bins will have been opened in sequence. However, in opening, it will be noticed that all of the bins will have been opened to the B level with the slight variations in bin openings illustrated in FIG. 7. The circuitry of FIG. 8 and the arrangement of FIG. 7 thus provides a simple means of obtaining sufficient variation for many of the common types of mixes required in practice.

From the foregoing, the construction and operation of the invention will be readily understood and numerous modifications and changes will appear to those skilled in the art. However, while specific terms have been employed, they are used in a generic and descriptive sense and not for purposes of limitation, the scope of the invention being defined in the claims.

I claim:

1. A control for a pivoted hopper discharge gate comprising actuating means for opening said gate, lever means rigidly attached to and moving with said gate in a predetermined path, a series of solenoid controlled pins placed adjacent and normally out of said path, control means for causing a selected pin in said series to move into said path prior to a particular opening of said gate, said pin so moved acting to block said lever means and thereby limit the opening of said gate by an amount determined by the position of said pin.

2. In combination, a pivoted hopper discharge gate, actuating means for opening said gate, level means having one end rigidly attached to said gate and the other end free to trace a predetermined vertical path upon the opening of said gate, a pair of vertical rail members located on opposite sides of said path, a series of solenoids mounted at different heights along one of said rail members, a series of horizontally aligned pins connected to each of said solenoids, sets of matching holes in said rail members, said holes being arranged for alignment with certain of said pins for receiving and supporting said pins at their extremities within said rails, control means to energize selectively one of said solenoids causing the pin attached thereto to move into and be supported within the set of holes aligned therewith, other control means to then energize said actuating means, thereby causing said lever to move into striking engagement with said pin, said combination resulting in said gate opening to a position corresponding to the position of said pin.

3. In a pivoted hopper discharge gate having two interlinked sections moving together on opening and closing; actuating means connected to one of said sections for opening said gate; projecting means having one end fixedly attached to one of said sections and the other end free, said projecting means moving in a fixed path with each opening of said gate; a series of solenoid controled pins located adjacent and normally out of said path; control means for causing a selected pin in said series to move into said path; other control means to energize said actuating means, thereby causing both of said sections to open and said fixed means to strike said selected pin, said gate opening to a position corresponding to the location of said selected pin.

4. In combination, a pivoted hopper discharge gate; actuating means for opening said gate; lever means having one end fixedly attached to said gate and the other end free to trace a predetermined path upon the opening thereof; a fixed member adjacent and to one side of said path; individual solenoids attached to said fixed member and located along the length thereof, each solenoid having a pin attached thereto; control means for selectively energizing one of said solenoids, thereby causing the pin attached thereto to move across said path; other control means to energize said actuating means, thereby opening said gate moving said lever means in said path and in striking engagement with said pin; said gate opening to a position corresponding with the location of said energized solenoid.

5. In a hopper fed material mixing machine, a plurality of pivoted gate means associated therewith for controlling the discharge therefrom; actuating means for opening said gate means; means projecting from each of said gate means and movable therewith along a fixed path with each opening thereof; solenoid controlled pins arranged in groups with one group for each of said projecting means; means to adjust in position each group of pins along the path travelled by the respective projecting means related thereto, certain pins in each group being at substantially the same relative position corresponding to substantialy the same opening for the respective gate means associated therewith; first control means for selectively energizing certain pins in certain of said groups, thereby causing the pins so energized to move into the respective projecting means paths associated with said groups; and second control means to energize certain of said actuating means thereby causing certain of said gate means to open and certain of said projecting means to move along certain of said paths, the amount by which said gate means opens being limited by said pins being in the path of said projecting means.

References Cited in the file of this patent

UNITED STATES PATENTS

| | | |
|---|---|---|
| 661,546 | Myers et al. | Nov. 13, 1900 |
| 1,932,976 | Lamb et al. | Oct. 31, 1933 |
| 2,131,984 | Stahmer | Oct. 4, 1938 |
| 2,236,145 | Kolb | Mar. 25, 1941 |
| 2,405,940 | Burkhardt | Aug. 20, 1946 |
| 2,603,342 | Martinson | July 15, 1952 |
| 3,042,261 | Lovette | July 3, 1962 |

FOREIGN PATENTS

| | | |
|---|---|---|
| 53,214 | Germany | Aug. 22, 1890 |
| 1,169,105 | France | Dec. 23, 1958 |
| 1,216,140 | France | Apr. 22, 1960 |